(12) United States Patent
Horiuchi et al.

(10) Patent No.: US 10,684,381 B2
(45) Date of Patent: Jun. 16, 2020

(54) RADIATION DETECTION DEVICE (71) Applicant: FUJIFILM Corporation, Tokyo (JP)

(72) Inventors: Hisatsugu Horiuchi, Kanagawa (JP);
Masateru Tateishi, Kanagawa (JP);
Shinsuke Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/230,718

(22) Filed: Dec. 21, 2018

(65) Prior Publication Data
US 2019/0196035 A1 Jun. 27, 2019

(30) Foreign Application Priority Data

Dec. 22, 2017 (JP) .................... 2017-246658

(51) Int. Cl.
*G01T 7/00* (2006.01)
*G01T 1/20* (2006.01)

(52) U.S. Cl.
CPC .............. *G01T 7/00* (2013.01); *G01T 1/2018* (2013.01)

(58) Field of Classification Search
CPC ....... G01T 1/2018; G01T 1/20; A61B 6/4283; G03B 42/02
See application file for complete search history.

(56) References Cited

U.S. PATENT DOCUMENTS

| 2004/0211909 A1* | 10/2004 | Watanabe | G03B 42/02 250/370.11 |
| 2009/0014659 A1* | 1/2009 | Hennessy | G03B 42/04 250/370.09 |
| 2011/0204239 A1* | 8/2011 | Yoshida | G01T 1/2023 250/361 R |
| 2012/0195409 A1* | 8/2012 | Suwa | G03B 42/04 378/189 |

FOREIGN PATENT DOCUMENTS

| JP | 2009-58733 A | 3/2009 |
| JP | 2012-177870 A | 9/2012 |

* cited by examiner

*Primary Examiner* — David P Porta
*Assistant Examiner* — Fani Boosalis
(74) *Attorney, Agent, or Firm* — Birch, Stewart, Kolasch & Birch, LLP (57) ABSTRACT

A radiation detection device includes: a radiation detection panel; a support member that supports the radiation detection panel; and a housing in which the radiation detection panel and the support member are housed, the housing includes a first housing portion, a second housing portion that supports the support member, and an intermediate member that is disposed between the first housing portion and the second housing portion and that has lower rigidity than the first housing portion, and a peripheral portion of the housing is formed by the first housing portion.

14 Claims, 9 Drawing Sheets

RADIATION DETECTION DEVICE

CROSS-REFERENCE TO RELATED APPLICATIONS

This application claims the benefit of Japanese Patent Application JP 2017-246658, filed Dec. 22, 2017, the entire content of which is hereby incorporated by reference, the same as if set forth at length.

BACKGROUND OF THE INVENTION

1. Field of the Invention

The present invention relates to a radiation detection device.

2. Description of the Related Art

An X-ray imaging apparatus that uses X-rays as radiation is known. The X-ray imaging apparatus has an X-ray detection device, which detects X-rays transmitted through a patient as a subject and generates an X-ray image signal based on the detected X-rays, and a console that communicates with the X-ray detection device.

As the X-ray detection device, there are a stationary type X-ray detection device fixed to an imaging table installed in a dedicated imaging room and a portable type X-ray detection device having a radiation detection panel housed in a portable housing.

The portable type X-ray detection device is called an electronic cassette and includes a radiation detection panel also called a flat panel detector (FPD), a memory for temporarily storing an X-ray image signal, and a communication unit for transmitting the X-ray image signal to the console.

Using the mobility of the electronic cassette, the electronic cassette is taken out of the imaging room and used. For example, the electronic cassette is used at the time of imaging at round visit for performing X-ray imaging while circulating a room where there is a patient who cannot move to the imaging room. The electronic cassette may be used outside the medical facility. The electronic cassette often receives a local impact due to its usage form.

JP2012-177870A and JP2009-058733A disclose X-ray detection devices each including a radiation detection panel, a support member for supporting the radiation detection panel from the rear surface side, and a housing in which the radiation detection panel and the support member are housed.

SUMMARY OF THE INVENTION

The radiation detection panel included in the X-ray detection device is supported by the housing. In consideration of the drop resistance performance (performance to prevent damage to the housing) of the X-ray detection device, it is preferable to form the housing using a material having high rigidity, such as metal. However, in a case where the rigidity of the housing is high, an impact received in a case where the X-ray detection device falls is transmitted to the radiation detection panel, which may cause damage to the radiation detection panel.

JP2012-177870A and JP2009-058733A disclose that the housing of the X-ray detection device is formed of resin. According to this configuration, it is possible to reduce the transmission of impact to the radiation detection panel, but it is difficult to secure the drop resistance performance of the device.

The invention has been made in view of the above circumstances, and it is an object of the invention to provide a radiation detection device capable of protecting a radiation detection panel.

A radiation detection device of the invention comprises: a radiation detection panel; a support member that supports the radiation detection panel; and a housing in which the radiation detection panel and the support member are housed. The housing comprises a first housing portion, a second housing portion that supports the support member, and an intermediate member that is disposed between the first housing portion and the second housing portion and that has lower rigidity than the first housing portion. A peripheral portion of the housing is formed by the first housing portion.

According to the invention, it is possible to provide a radiation detection device capable of protecting a radiation detection panel.

DESCRIPTION OF THE PREFERRED EMBODIMENTS

Hereinafter, an embodiment of the invention will be described with reference to the diagrams.

Figure 1:
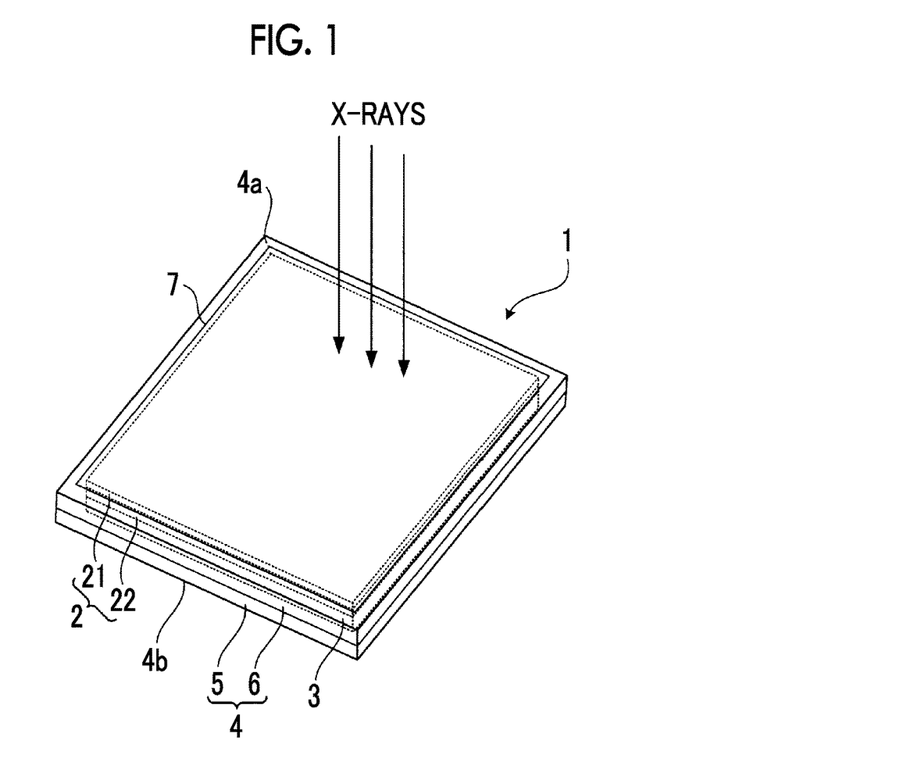
FIG. 1 is a diagram showing the schematic configuration of an electronic cassette 1 that is an embodiment of a radiation detection device of the invention.

FIG. 1 is a diagram showing the schematic configuration of an electronic cassette 1 that is an embodiment of a radiation detection device of the invention.

The electronic cassette 1 comprises a radiation detection panel 2, a support member 3 that supports the radiation detection panel 2 from the rear surface side (side opposite to the X-ray incidence side), and a portable housing 4 having a rectangular parallelepiped shape in which the radiation detection panel 2 and the support member 3 are housed.

The housing 4 comprises a top side housing 6 disposed on the X-ray incidence side and a back side housing 5 that is fitted into the top side housing 6 and is disposed on a side opposite to the X-ray incidence side. It is desirable to form the top side housing 6 using a material that can realize weight reduction as well as a load bearing capacity. For example, the top side housing 6 is formed of a material having a specific gravity of 3.0 or less and a Young's modulus of 1.8 Gpa or more, such as a magnesium alloy, an aluminum alloy, a fiber reinforced resin, a cellulose nanofiber (CNF) reinforced resin, or a resin.

The housing 4 has, for example, a size complying with the international organization for standardization (ISO) 4090: 2001. A rectangular opening is formed on a top surface 4a of the housing 4. A transmission plate 7 allowing X-rays as radiation to be transmitted therethrough is attached to the opening.

The electronic cassette 1 is positioned in a state in which a rear surface 4b of the housing 4 on the side opposite to the top surface 4a is brought into contact with, for example, a table and the top surface 4a faces an X-ray source (not shown). X-rays are emitted from above the top surface 4a through a subject.

The radiation detection panel 2 is configured to include a scintillator 21 and a light detection substrate 22. The scintillator 21 and the light detection substrate 22 are laminated in order of the scintillator 21 and the light detection substrate 22 as viewed from the top surface 4a side on which X-rays are incident.

The scintillator 21 has a phosphor, such as CsI:Tl (thallium-activated cesium iodide) or GOS ($Gd_2O_2S$:Tb, terbium-activated gadolinium oxysulfide), and converts X-rays incident through the transmission plate 7 into visible light and emits the visible light. The scintillator 21 is formed on the light detection substrate 22 by vapor deposition or the like.

A radiation detection panel may be used in which the light detection substrate 22 and the scintillator 21 are laminated in this order as viewed from the top surface 4a side on which X-rays are incident.

Alternatively, a direct conversion type radiation detection panel that directly converts X-rays into signal charges with a photoconductive film, such as amorphous selenium, may be used.

The light detection substrate 22 detects visible light emitted from the scintillator 21, and converts the visible light into an image signal.

Inside the housing 4 of the electronic cassette 1, in addition to the components described above, a circuit board, a battery as a power supply unit, and the like are housed.

A circuit for controlling the driving of the light detection substrate 22, a circuit for processing the image signal output from the light detection substrate 22, a semiconductor memory, a communication interface for communicating with the outside, a power supply circuit, and the like are formed on the circuit board housed in the housing 4.

The battery housed in the housing 4 is configured to include one or more secondary rechargeable batteries, for example. The battery supplies electric power to each unit of the electronic cassette 1.

The support member 3 is a member that supports the radiation detection panel 2, and a material having high rigidity, such as an aluminum alloy, a magnesium alloy, or a carbon fiber reinforced resin, can be used.

The support member 3 is a member having a flat plate shape parallel to the imaging surface of the radiation detection panel 2, and is bonded to a surface of the radiation detection panel 2 opposite to the X-ray incidence side, for example, by a double-sided tape having a highly flexible material, such as foam or resin, as a base material. The support member 3 is supported by the housing 4.

Figure 2:
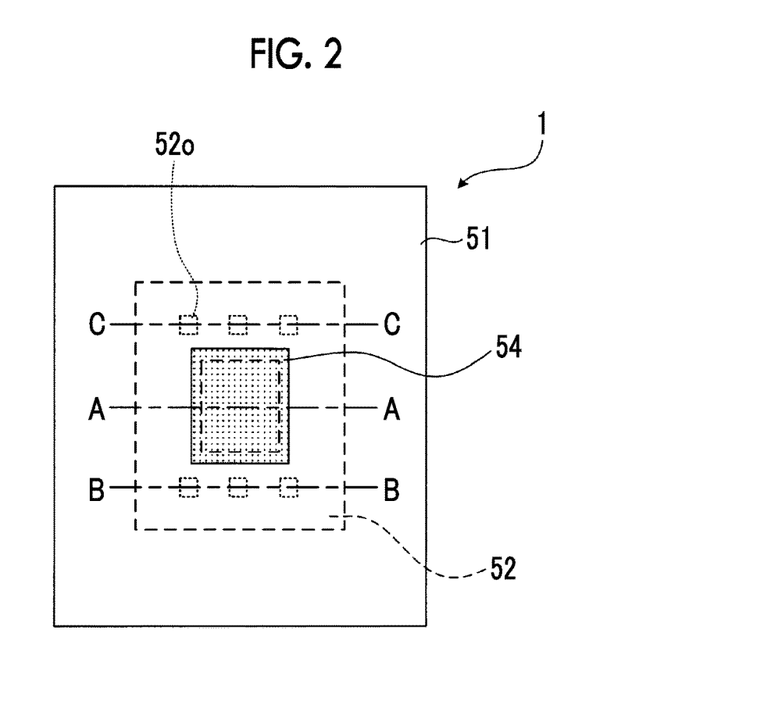
FIG. 2 is a plan view of the electronic cassette 1 shown in FIG. 1 as viewed from a back side housing 5 side.
Figure 3:
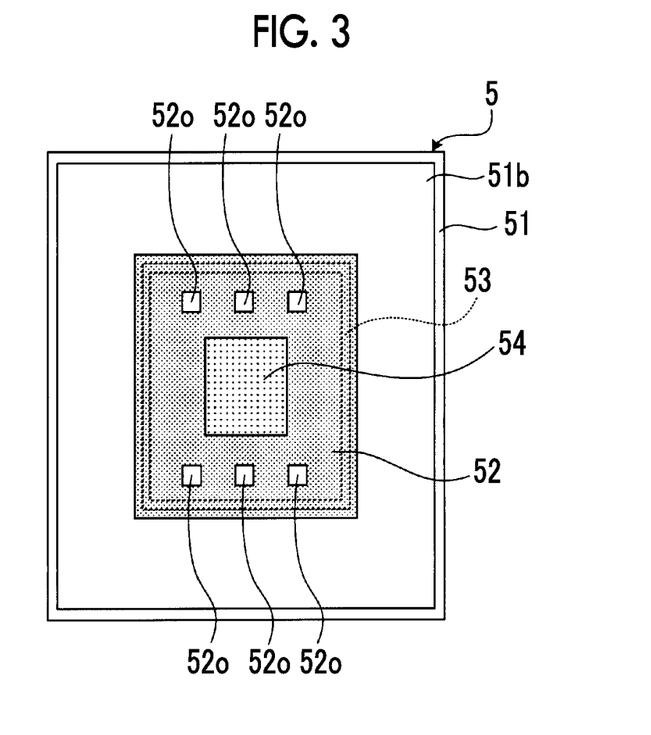
FIG. 3 is a plan view of the back side housing 5 of the electronic cassette 1 shown in FIG. 1 as viewed from a support member 3 side.
Figure 4:
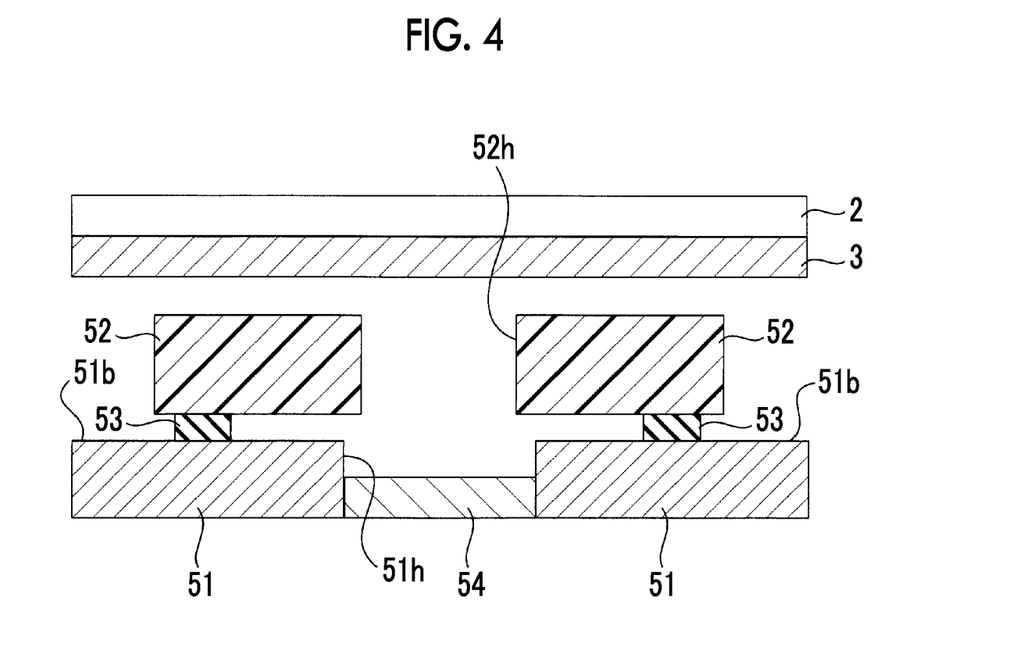
FIG. 4 is a schematic cross-sectional view of the electronic cassette 1 shown in FIG. 2 taken along the line A-A.
Figure 5:
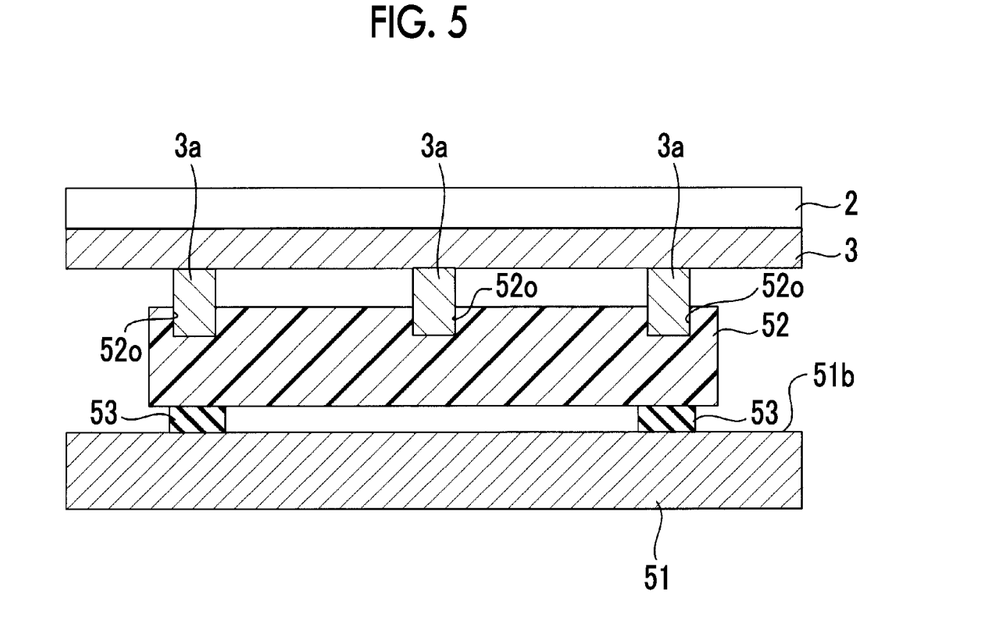
FIG. 5 is a schematic cross-sectional view of the electronic cassette 1 shown in FIG. 2 taken along the line B-B.

FIG. 2 is a plan view of the electronic cassette 1 shown in FIG. 1 as viewed from the back side housing 5 side. FIG. 3 is a plan view of the back side housing 5 of the electronic cassette 1 shown in FIG. 1 as viewed from the support member 3 side. FIG. 4 is a schematic cross-sectional view of the electronic cassette 1 shown in FIG. 2 taken along the line A-A. FIG. 5 is a schematic cross-sectional view of the electronic cassette 1 shown in FIG. 2 taken along the line B-B. A schematic cross-sectional view of the electronic cassette 1 shown in FIG. 2 taken along the line C-C is the same as FIG. 5.

As shown in FIGS. 2 and 3, the back side housing 5 comprises a rectangular frame-shaped first housing portion 51 in which a rectangular opening portion is formed at the center, a rectangular frame-shaped second housing portion 52 in which a rectangular opening portion 52h (refer to FIG. 4) smaller than the opening portion 51h (refer to FIG. 4) of the first housing portion 51 is formed at the center, a cover portion 54 that is fitted into the opening portion 51h of the first housing portion 51 to close the opening portion 51h, an intermediate member 53 (refer to FIGS. 2 to 4) disposed between the first housing portion 51 and the second housing portion 52 to bond the first housing portion 51 and the second housing portion 52 to each other.

The first housing portion 51 is a portion to be fitted into the top side housing 6, and it is desirable to form the first housing portion 51 using a material that can realize weight reduction as well as a load bearing capacity, similarly to the top side housing 6. For example, the first housing portion 51 is formed of a material having a specific gravity of 3.0 or less and a Young's modulus of 1.8 Gpa or more, such as a magnesium alloy, an aluminum alloy, a fiber reinforced resin, a cellulose nanofiber (CNF) reinforced resin, or a resin.

The first housing portion 51 and the top side housing 6 form a peripheral portion of the back side housing 5. That is, four corner portions of the housing 4, which are susceptible to shock in a case where the electronic cassette 1 falls onto the ground or the like, are formed by the first housing portion 51 having high rigidity and the top side housing 6. By the first housing portion 51 and the top side housing 6, a first housing portion is formed.

The opening portion 51h of the first housing portion 51 is provided in order to take out a battery built into the housing 4. An accommodating portion for accommodating a battery (not shown) therein is formed in a space inside the housing 4 formed by the opening portion 51h and the opening portion 52h shown in FIG. 4.

During the use of the electronic cassette 1, the accommodating portion is closed since the opening portion 51h is closed by the cover portion 54. The cover portion 54 is formed by, for example, the same material as the first housing portion 51. The rear surface 4b (refer to FIG. 1) of the housing 4 is formed by the outer surface of the first housing portion 51 and the outer surface of the cover portion 54.

As shown in FIGS. 3 to 5, the second housing portion 52 is bonded to an inner surface 51b of the first housing portion 51 on the support member 3 side by an intermediate member 53. That is, the second housing portion 52 is disposed between the first housing portion 51 and the support member 3. For example, the second housing portion 52 is formed of a resin material, such as a synthetic resin or rubber, and has lower rigidity than the first housing portion 51. The rigidity in this specification is defined by the magnitude of Young's modulus.

The second housing portion 52 is disposed such that the center of the opening portion 52h overlaps the opening portion 51h of the first housing portion 51.

As shown in FIGS. 2, 3, and 5, six recessed portions 52o are formed on a surface of the second housing portion 52 facing the support member 3.

As shown in FIG. 5, a protruding portion 3a is formed at a position of the support member 3 facing each recessed portion 52o of the second housing portion 52. The protruding portion 3a is fitted into the recessed portion 52o of the second housing portion 52. Therefore, the support member 3 is supported by the second housing portion 52.

The second housing portion 52 and the support member 3 may be bonded to each other by an adhesive or the like or may be screwed together so that the second housing portion 52 supports the support member 3.

The support member 3 is supported by only the second housing portion 52, and does not have a portion in contact with the first housing portion 51 and the top side housing 6. The radiation detection panel 2 is supported by only the support member 3, and does not have a portion in contact with the housing 4. In addition, the second housing portion 52 does not have a portion exposed to the outside in a state in which the cover portion 54 is attached to the second housing portion 52.

As shown in FIG. 3, the intermediate member 53 is formed in a frame shape along the four sides of the second housing portion 52.

The intermediate member 53 is formed of, for example, a double-sided tape having a highly flexible material, such as foam or resin, as a base material or an adhesive formed of a highly flexible material, such as a resin. Thus, since the intermediate member 53 includes a highly flexible material, the rigidity of the intermediate member 53 is lower than the rigidity of the first housing portion 51.

A case is assumed in which the electronic cassette 1 configured as described above falls onto the ground and an impact is applied to the first housing portion 51 forming the peripheral portion of the housing 4. In this case, the impact force is transmitted in order of the first housing portion 51, the intermediate member 53, the second housing portion 52, the support member 3, the double-sided tape for bonding the support member 3 and the radiation detection panel 2 to each other, and the radiation detection panel 2.

The intermediate member 53 has lower rigidity than the first housing portion 51. For this reason, the impact force applied to the first housing portion 51 is attenuated by the intermediate member 53 and is then transmitted to the radiation detection panel 2 through the second housing portion 52, the support member 3, and the double-sided tape. Therefore, since the force transmitted to the radiation detection panel 2 can be reduced, it is possible to improve the durability of the radiation detection panel 2 (particularly, the scintillator 21). In a case where a columnar scintillator directly formed by vapor deposition on the light detection substrate 22 is used as the scintillator 21, damage to the scintillator 21 can be effectively prevented since the impact transmitted to the radiation detection panel 2 is reduced as described above. As a result, it is possible to improve the reliability of the product.

In the electronic cassette 1, the peripheral portion of the housing 4 is formed by the first housing portion 51 and the top side housing 6 having high rigidity. For this reason, even in a case where an impact is applied to the peripheral portion, it is possible to prevent damage to the housing 4. Therefore, it is possible to secure sufficient drop resistance performance.

In the electronic cassette 1, the rigidity of the second housing portion 52 is lower than that of the first housing portion 51. Therefore, since a material that is lighter than the first housing portion 51 can be adopted as the second housing portion 52, it is possible to reduce the weight of the electronic cassette 1.

In addition, since the rigidity of the second housing portion 52 is lower than that of the first housing portion 51, the impact force at the time of falling can be further attenuated by the second housing portion 52. As a result, it is possible to improve the durability of the radiation detection panel 2.

The rigidity of the second housing portion 52 may be equal to or greater than that of the first housing portion 51. The impact force applied to the first housing portion 51 is transmitted to the second housing portion 52 after being attenuated by the intermediate member 53. Therefore, even with this configuration, it is possible to sufficiently prevent damage to the radiation detection panel 2.

In addition, the second housing portion 52 of the electronic cassette 1 does not have a portion exposed to the outside in a state in which the cover portion 54 is attached to the second housing portion 52. Therefore, since an external impact is not directly applied to the second housing portion 52, it is possible to improve the durability of the radiation detection panel 2. In a case where the rigidity of the second housing portion 52 is equal to or greater than the rigidity of the first housing portion 51, a configuration in which the second housing portion 52 does not have a portion exposed to the outside is particularly effective.

In the electronic cassette 1, the intermediate member 53 is formed in a frame shape. Therefore, by using, for example, double-sided tape or adhesive having waterproof performance as the intermediate member 53, it is possible to improve the waterproof performance of the electronic cassette 1.

As a material used for the intermediate member 53, a material having a 25% compressive load of 0.02 MPa or more and 1.37 MPa or less is preferably used. The width of the intermediate member 53 in a direction parallel to the imaging surface of the radiation detection panel 2 is preferably 2 mm or more and less than 10 mm. In addition, the thickness of the intermediate member 53 in a direction perpendicular to the imaging surface of the radiation detection panel 2 is preferably 0.25 mm or more and less than 2.0 mm. With these configurations, it is possible to enhance the impact force absorption effect while securing the strength of the intermediate member 53 itself.

From the viewpoint of enhancing the impact absorption effect, the lower limit value of the width of the intermediate member 53 may be less than 2 mm. However, in a case where the intermediate member 53 is made to have waterproof performance, it is possible to obtain a sufficient waterproof function by setting the lower limit value of the width to 2 mm or more.

Figure 6:
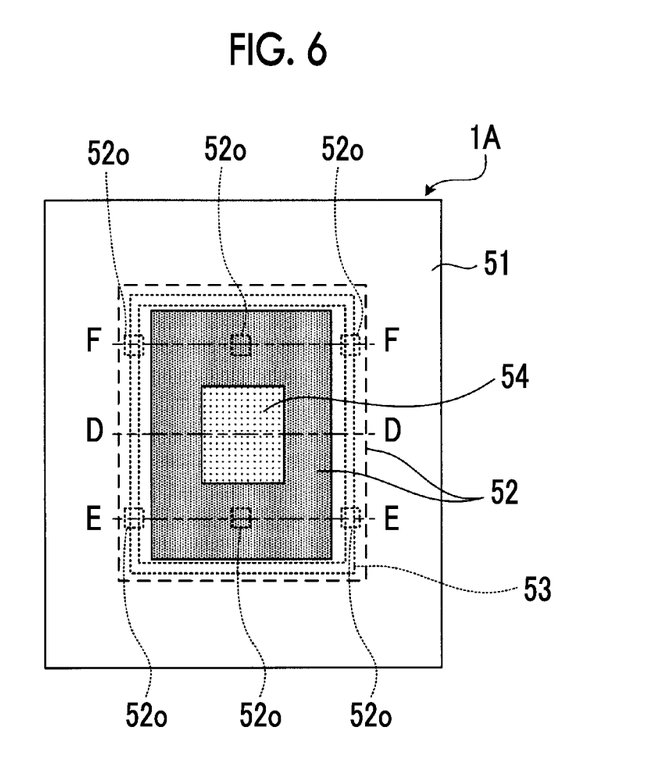
FIG. 6 is a plan view of an electronic cassette 1A, which is a modification example of the electronic cassette 1 shown in FIG. 1, as viewed from the back side housing 5 side.
Figure 7:
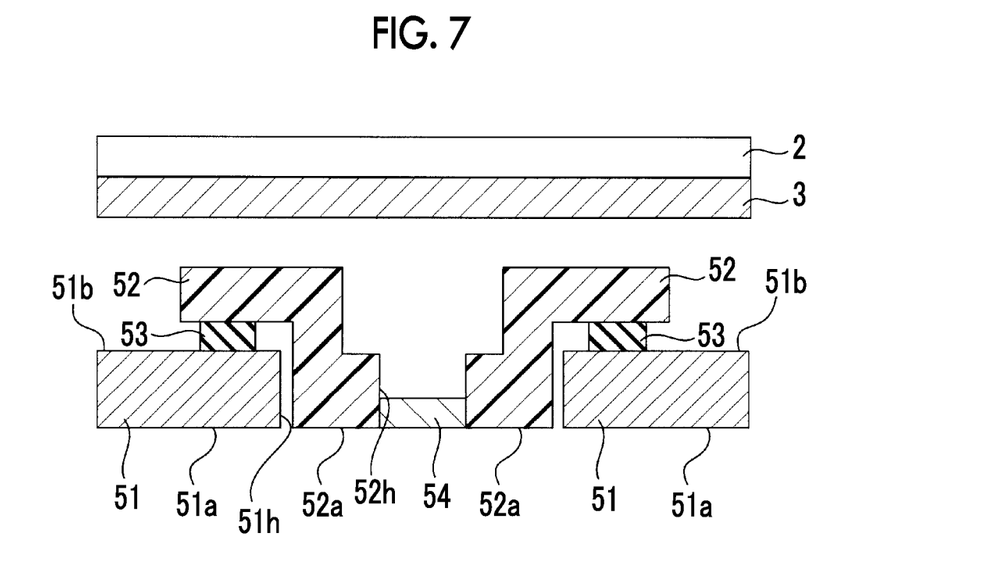
FIG. 7 is a schematic cross-sectional view of the electronic cassette 1A shown in FIG. 6 taken along the line D-D.
Figure 8:
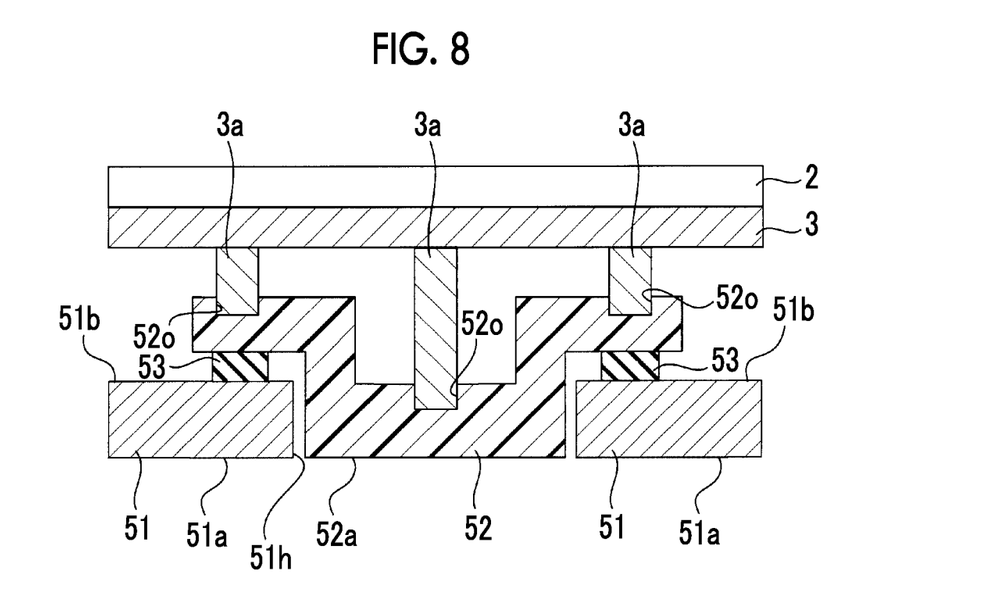
FIG. 8 is a schematic cross-sectional view of the electronic cassette 1A shown in FIG. 6 taken along the line E-E.

FIG. 6 is a plan view of an electronic cassette 1A, which is a modification example of the electronic cassette 1 shown in FIG. 1, as viewed from the back side housing 5 side. FIG. 7 is a schematic cross-sectional view of the electronic cassette 1A shown in FIG. 6 taken along the line D-D. FIG. 8 is a schematic cross-sectional view of the electronic cassette 1A shown in FIG. 6 taken along the line E-E. A schematic cross-sectional view of the electronic cassette 1A shown in FIG. 6 taken along the line F-F is the same as FIG. 8.

The electronic cassette 1A is largely different from the electronic cassette 1 in that a part of the second housing portion 52 is exposed to the outside to form a part of the rear surface 4b of the housing 4.

As shown in FIG. 7, the cross-sectional shape of the second housing portion 52 of the electronic cassette 1A is a protruding shape that protrudes toward a side opposite to the support member 3. The protruding portion of the second housing portion 52 is inserted through the opening portion 51h of the first housing portion 51, and the top surface of the protruding portion forms an exposed surface 52a that is exposed to the outside. The cover portion 54 is inserted into the opening portion 52h of the second housing portion 52 of the electronic cassette 1A. As a result, the battery accommodating portion is closed.

As shown in FIGS. 7 and 8, an exposed surface 51a that is exposed to the outside of the first housing portion 51 and the exposed surface 52a that is exposed to the outside of the second housing portion 52 are formed on the same plane. The fact that two surfaces are on the same plane means that the difference between the positions of the two surfaces in a direction perpendicular to the imaging surface of the radiation detection panel 2 is zero. This difference between the positions may include tolerance.

Similarly to the electronic cassette 1, the first housing portion 51 and the second housing portion 52 of the electronic cassette 1A are bonded to each other by the intermediate member 53 having a frame shape in a plan view (refer to FIG. 6).

In addition, similarly to the electronic cassette 1, the second housing portion 52 of the electronic cassette 1A supports the support member 3. Specifically, the recessed portion 52o is formed on a surface of the second housing portion 52 of the electronic cassette 1A on the support member 3 side, and the protruding portion 3a of the support member 3 is fitted into the recessed portion 52o (refer to FIG. 8).

In the electronic cassette 1A configured as described above, the exposed surface 51a of the first housing portion 51 and the exposed surface 52a of the second housing portion 52 are formed on the same plane, and the rear surface 4b of the housing 4 is formed by the exposed surfaces.

According to this configuration, the electronic cassette 1A is used in a state in which the exposed surface 52a of the second housing portion 52 is in contact with a table or the like. Therefore, in a case where a load is applied to the housing 4 from the top side housing 6 side, the load can be received by the second housing portion 52 and the table. As a result, it is possible to improve the load bearing capacity. In addition, since the level difference between the exposed surface 51a and the exposed surface 52a is almost eliminated, it is difficult for the electronic cassette 1A to be caught at the time of installation of the electronic cassette 1A onto the examination table. As a result, it is possible to improve usability.

According to the electronic cassette 1A, by making the intermediate member 53 have a waterproof function, it is possible to prevent moisture from entering the inside of the housing 4 through a gap between the first housing portion 51 and the second housing portion 52. As a result, it is possible to improve waterproof performance.

Figure 9:
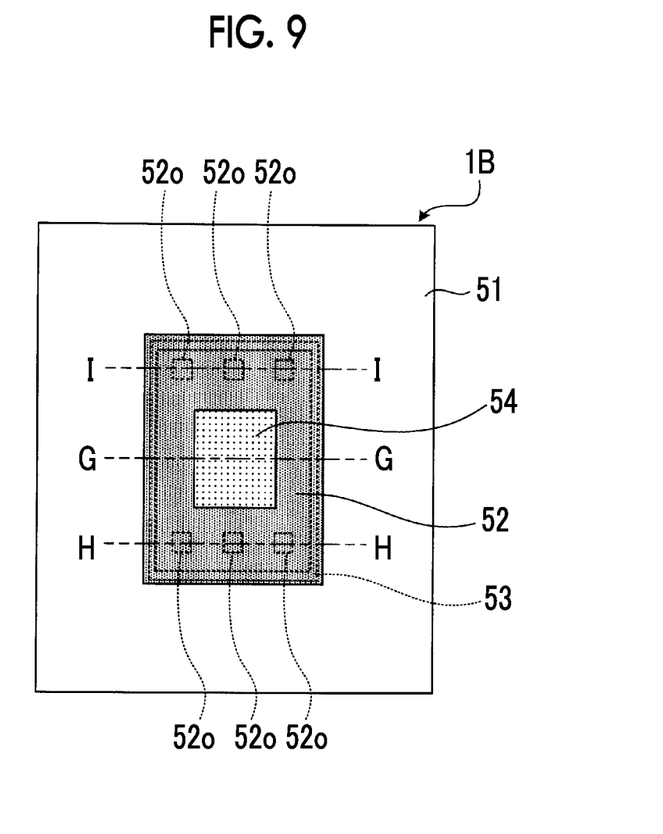
FIG. 9 is a plan view of an electronic cassette 1B, which is a modification example of the electronic cassette 1 shown in FIG. 1, as viewed from the back side housing 5 side.
Figure 10:
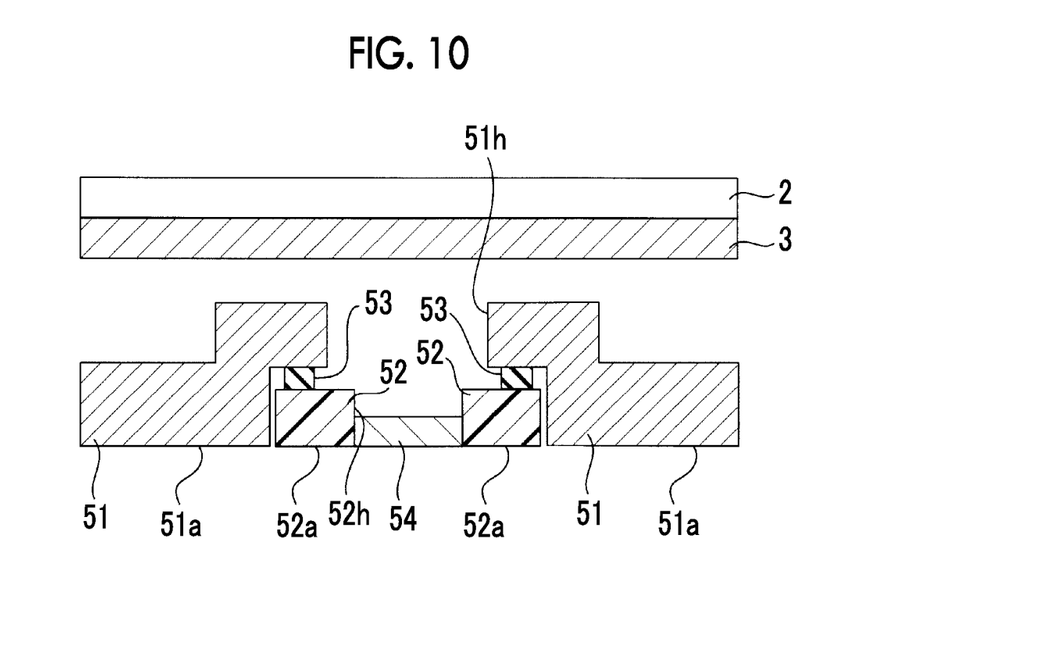
FIG. 10 is a schematic cross-sectional view of the electronic cassette 1B shown in FIG. 9 taken along the line G-G.
Figure 11:
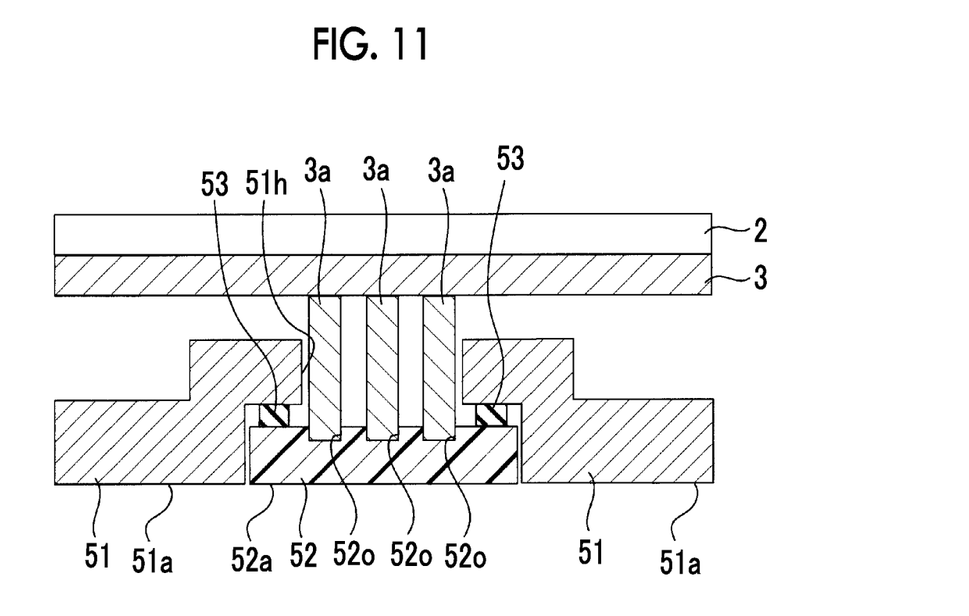
FIG. 11 is a schematic cross-sectional view of the electronic cassette 1B shown in FIG. 9 taken along the line H-H.

FIG. 9 is a plan view of an electronic cassette 1B, which is a modification example of the electronic cassette 1 shown in FIG. 1, as viewed from the back side housing 5 side. FIG. 10 is a schematic cross-sectional view of the electronic cassette 1B shown in FIG. 9 taken along the line G-G. FIG. 11 is a schematic cross-sectional view of the electronic cassette 1B shown in FIG. 9 taken along the line H-H. A schematic cross-sectional view of the electronic cassette 1B shown in FIG. 9 taken along the line I-I is the same as FIG. 11.

The electronic cassette 1B is largely different from the electronic cassette 1 in that a part of the second housing portion 52 is exposed to the outside to form a part of the rear surface 4b of the housing 4.

As shown in FIGS. 10 and 11, the cross-sectional shape of the first housing portion 51 of the electronic cassette 1B is a protruding shape that protrudes toward the support member 3 side. The first housing portion 51 of the electronic cassette 1B has an opening portion 51h in a portion protruding toward the support member 3 side.

The second housing portion 52 of the electronic cassette 1B is disposed in a recessed portion of the first housing portion 51 as viewed from the rear surface 4b side of the housing 4, and a surface of the second housing portion 52 on a side opposite to the support member 3 side is the exposed surface 52a that is exposed to the outside. The cover portion 54 is inserted into the opening portion 52h of the second housing portion 52 of the electronic cassette 1B. As a result, the battery accommodating portion is closed.

Similarly to the electronic cassette 1, the second housing portion 52 of the electronic cassette 1B is bonded to the first housing portion 51 by the intermediate member 53 formed in a frame shape (refer to FIG. 9).

As shown in FIGS. 10 and 11, in the electronic cassette 1B, the exposed surface 51a that is exposed to the outside of the first housing portion 51 and the exposed surface 52a that is exposed to the outside of the second housing portion 52 are formed on the same plane.

In addition, similarly to the electronic cassette 1, the second housing portion 52 of the electronic cassette 1B supports the support member 3. Specifically, the recessed portion 52o is formed on a surface of the second housing portion 52 of the electronic cassette 1B on the support member 3 side, and the protruding portion 3a of the support member 3 is fitted into the recessed portion 52o (refer to FIG. 11).

In the electronic cassette 1B configured as described above, the exposed surface 51a of the first housing portion 51 and the exposed surface 52a of the second housing portion 52 are formed on the same plane, and the rear surface 4b of the housing 4 is formed by these exposed surfaces. Therefore, the same effect as the electronic cassette 1A can be obtained.

Figure 12:
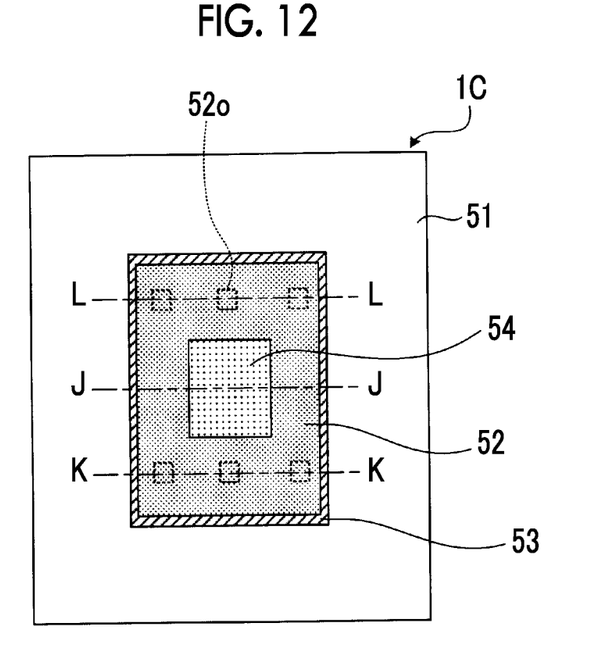
FIG. 12 is a plan view of an electronic cassette 1C, which is a modification example of the electronic cassette 1 shown in FIG. 1, as viewed from the back side housing 5 side.

FIG. 12 is a plan view of an electronic cassette 1C, which is a modification example of the electronic cassette 1 shown in FIG. 1, as viewed from the back side housing 5 side. FIG.

Figure 13:
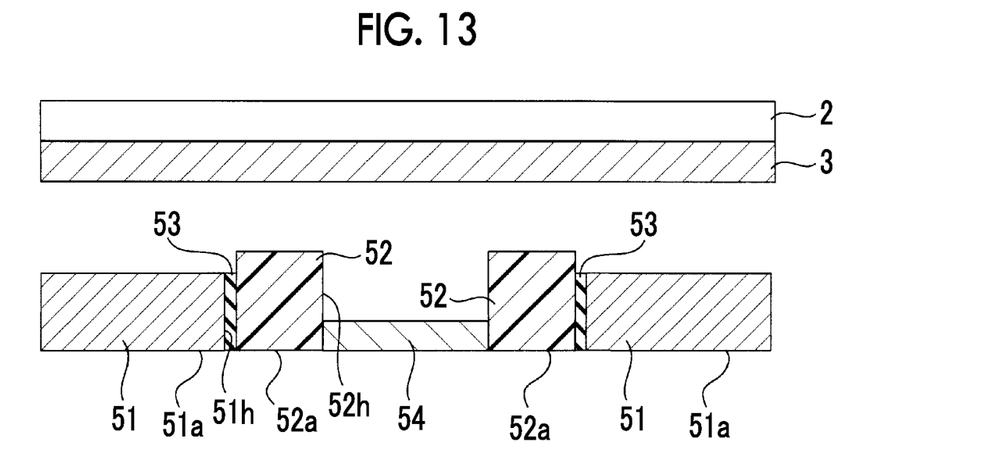
FIG. 13 is a schematic cross-sectional view of the electronic cassette 1C shown in FIG. 12 taken along the line J-J.
Figure 14:
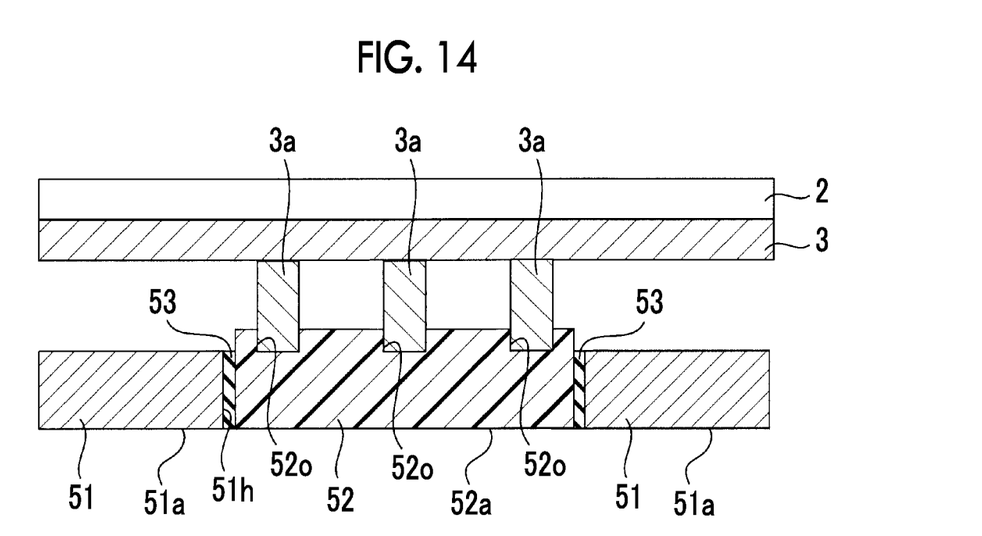
FIG. 14 is a schematic cross-sectional view of the electronic cassette 1C shown in FIG. 12 taken along the line K-K.

13 is a schematic cross-sectional view of the electronic cassette 1C shown in FIG. 12 taken along the line J-J. FIG. 14 is a schematic cross-sectional view of the electronic cassette 1C shown in FIG. 12 taken along the line K-K. A schematic cross-sectional view of the electronic cassette 1C shown in FIG. 12 taken along the line L-L is the same as FIG. 14.

The electronic cassette 1C is largely different from the electronic cassette 1 in that the second housing portion 52 is exposed to the outside to form a part of the rear surface 4b of the housing 4.

As shown in FIGS. 13 and 14, the second housing portion 52 of the electronic cassette 1C is disposed in the opening portion 51h of the first housing portion 51. The cover portion 54 is inserted into the opening portion 52h of the second housing portion 52 of the electronic cassette 1C. As a result, the battery accommodating portion is closed.

As shown in FIG. 12, the intermediate member 53 having a frame shape in a plan view is formed between the first housing portion 51 and the second housing portion 52 of the electronic cassette 1C. The first housing portion 51 and the second housing portion 52 of the electronic cassette 1C are bonded to each other by the intermediate member 53.

As shown in FIGS. 13 and 14, the exposed surface 51a that is exposed to the outside of the first housing portion 51 of the electronic cassette 1C and the exposed surface 52a that is exposed to the outside of the second housing portion 52 of the electronic cassette 1C are formed on the same plane.

Similarly to the electronic cassette 1, the second housing portion 52 of the electronic cassette 1C supports the support member 3. Specifically, the recessed portion 52o is formed on a surface of the second housing portion 52 of the electronic cassette 1C on the support member 3 side, and the protruding portion 3a of the support member 3 is fitted into the recessed portion 52o (refer to FIG. 14).

In the electronic cassette 1C configured as described above, the exposed surface 51a of the first housing portion 51 and the exposed surface 52a of the second housing portion 52 are formed on the same plane, and the rear surface 4b of the housing 4 is formed by the exposed surfaces. According to this configuration, the same effect as the electronic cassette 1A can be obtained.

Each of the electronic cassettes 1A, 1B, and 1C is configured such that a part of the second housing portion 52 is exposed to the outside. The peripheral portion of the housing 4 mainly receives an impact in a case where the electronic cassettes 1A, 1B, and 1C fall, and the peripheral portion is formed by the first housing portion 51 and the top side housing 6 having high rigidity. Therefore, even with the configuration of the electronic cassettes 1A, 1B, and 1C, it is possible to sufficiently protect the radiation detection panel 2 from the impact at the time of falling.

Figure 15:
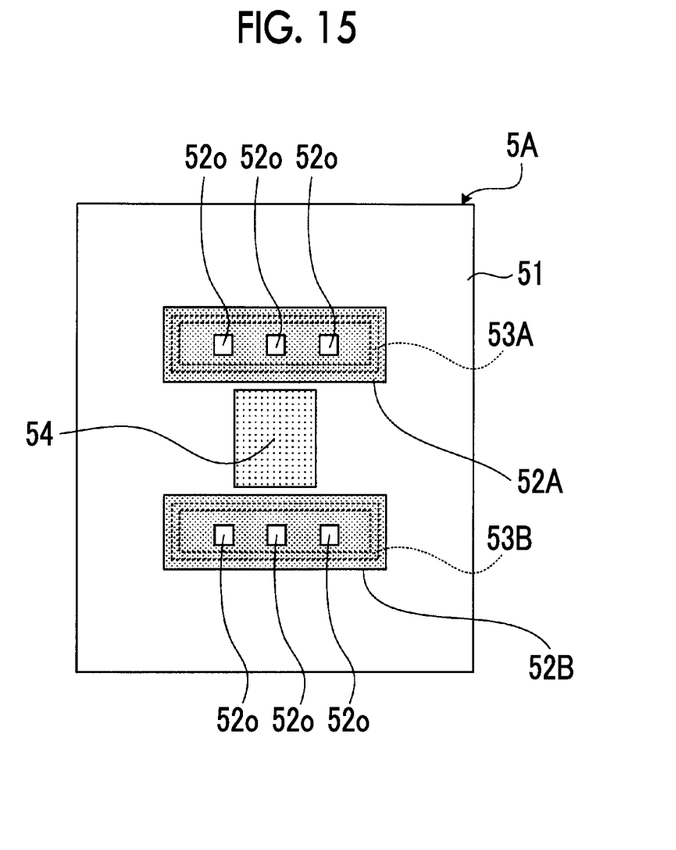
FIG. 15 is a diagram showing a back side housing 5A that is a modification example of the back side housing 5 of the electronic cassette 1 shown in FIG. 1.

FIG. 15 is a diagram showing a back side housing 5A, which is a modification example of the back side housing 5 of the electronic cassette 1 shown in FIG. 1, and is a plan view of the back side housing 5A as viewed from the support member 3 side.

The back side housing 5A has the same configuration as the back side housing 5 of the electronic cassette 1 except that the second housing portion 52 is formed by two portions of a plate-shaped second housing portion 52A and a plate-shaped second housing portion 52B, the second housing portion 52A and the first housing portion 51 are bonded to each other by a frame-shaped intermediate member 53A, and the second housing portion 52B and the first housing portion 51 are bonded to each other by a frame-shaped intermediate member 53B.

In this manner, the weight can be reduced by arranging the second housing portion 52A and the second housing portion 52B only at a position where the recessed portion 52o for supporting the support member 3 is to be formed. The configuration of dividing the second housing portion can also be similarly applied to the electronic cassettes 1A to 1C. In this case, since it is possible to increase the area of the first housing portion 51 in the housing 4, it is possible to increase the strength of the housing 4.

Figure 16:
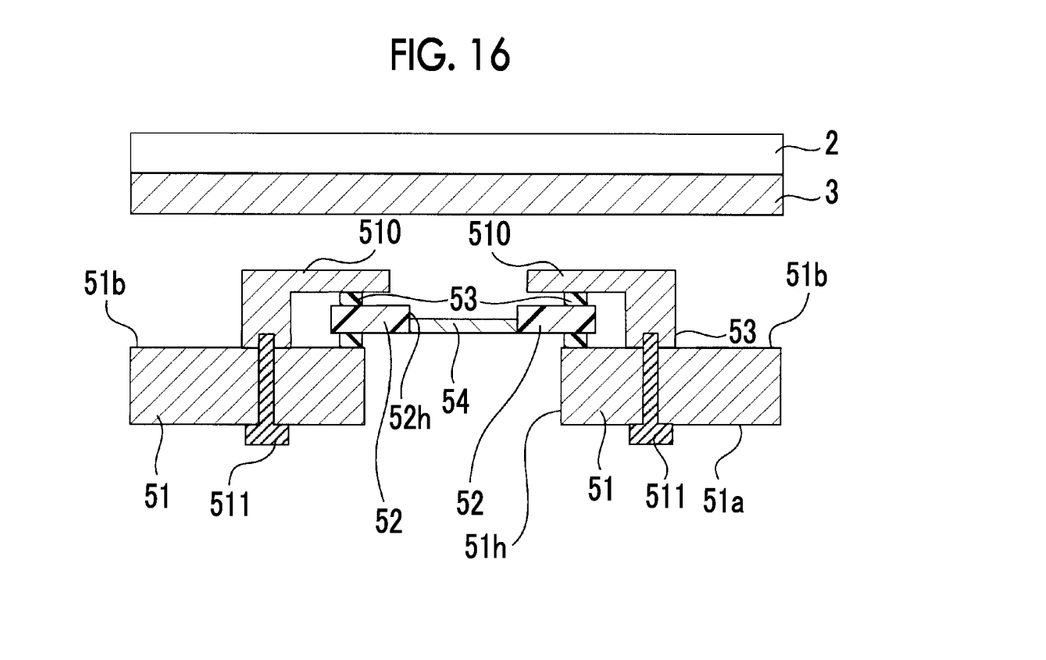
FIG. 16 is a modification example of the back side housing 5 of the electronic cassette 1 shown in FIG. 1, and is a cross-sectional view corresponding to FIG. 4.
Figure 17:
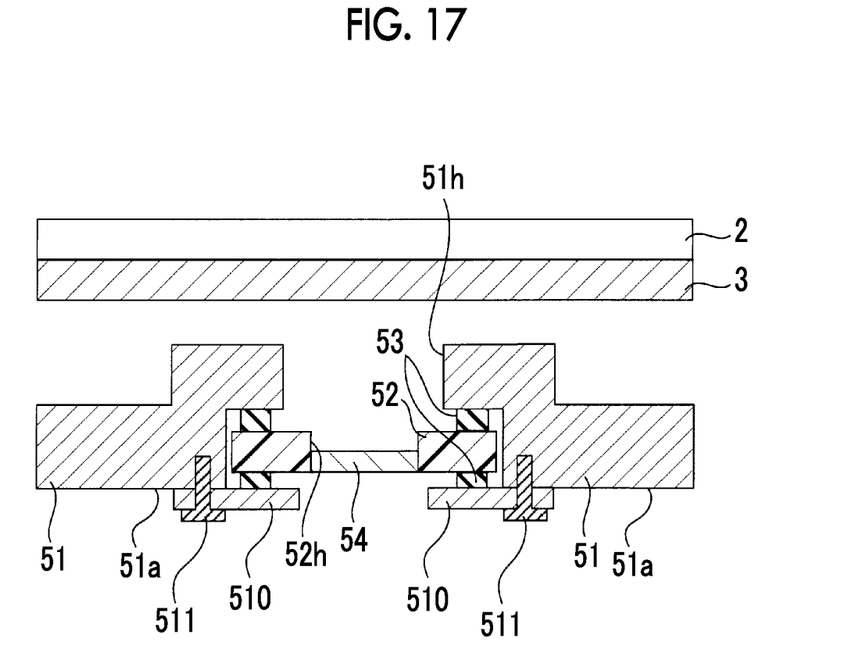
FIG. 17 is a modification example of the back side housing 5 of the electronic cassette 1 shown in FIG. 1, and is a cross-sectional view corresponding to FIG. 4.

FIGS. 16 and 17 are modification examples of the back side housing 5 of the electronic cassette 1 shown in FIG. 1, and are cross-sectional views corresponding to FIG. 4.

In the configuration examples shown in FIGS. 16 and 17, a member 510 formed of the same material as the first housing portion 51 is fixed to the first housing portion 51 by a screw 511. A pair of intermediate members 53 are disposed in a space interposed between the member 510 and the first housing portion 51, and the second housing portion 52 is fixed by being interposed between the pair of intermediate members 53. Even with such a configuration, the same effect as the electronic cassette 1 shown in FIG. 1 can be obtained.

As described above, the following matters are disclosed in this specification.

(1) A radiation detection device comprising: a radiation detection panel; a support member that supports the radiation detection panel; and a housing in which the radiation detection panel and the support member are housed, where the housing comprises a first housing portion, a second housing portion that supports the support member, and an intermediate member that is disposed between the first housing portion and the second housing portion and that has lower rigidity than the first housing portion, and a peripheral portion of the housing is formed by the first housing portion.

(2) The radiation detection device described in (1), where the second housing portion has lower rigidity than the first housing portion.

(3) The radiation detection device described in (2), where the first housing portion is configured to include an alloy, and the second housing portion is configured to include a resin.

(4) The radiation detection device described in any one of (1) to (3), where the intermediate member is a double-sided tape having a foam or a resin as a base material.

(5) The radiation detection device described in any one of (1) to (4), where the intermediate member is formed in a frame shape as viewed from a direction perpendicular to the radiation detection panel.

(6) The radiation detection device described in any one of (1) to (5), where the second housing portion is disposed between the support member and the first housing portion.

(7) The radiation detection device described in any one of (1) to (5), where each of the first housing portion and the second housing portion includes an exposed surface that forms a rear surface of the housing on a side opposite to a radiation incidence side, and the exposed surface of the first housing portion and the exposed surface of the second housing portion are coplanar.

(8) The radiation detection device described in any one of (1) to (7), where the second housing portion is divided into a plurality of parts.

(9) The radiation detection device described in any one of (1) to (8), where the radiation detection panel includes a light detection substrate and a scintillator.

(10) The radiation detection device described in (9), where the scintillator is formed on the light detection substrate.

The invention is highly convenient and effective in a case where the invention is applied to an X-ray imaging apparatus and the like.

EXPLANATION OF REFERENCES 1, 1A, 1B, 1C: electronic cassette
2: radiation detection panel
21: scintillator
22: light detection substrate
3: support member
3a: protruding portion
4: housing
4a: top surface
4b: rear surface
5, 5A: back side housing
51: first housing portion
51a: exposed surface
51b: inner surface
51h: opening portion
52, 52A, 52B: second housing portion
52a: exposed surface
52o: recessed portion
52h: opening portion
53, 53A, 53B: intermediate member
54: cover portion
6: top side housing
7: transmission plate
510: member
511: screw

What is claimed is:

1. A radiation detection device comprising:
a radiation detection panel;
a support member that supports the radiation detection panel; and
a housing in which the radiation detection panel and the support member are housed,
wherein the housing comprises a first housing portion, a second housing portion that supports the support member, and an intermediate member that is disposed between the first housing portion and the second housing portion and that has lower rigidity than the first housing portion,
a peripheral portion of the housing is formed by the first housing portion, and
the second housing portion has lower rigidity than the first housing portion.

2. The radiation detection device according to claim 1, wherein the first housing portion is configured to comprise an alloy, and the second housing portion is configured to comprise a resin.

3. The radiation detection device according to claim 2, wherein the intermediate member is a double-sided tape having a foam or a resin as a base material.

4. The radiation detection device according to claim 2, wherein the intermediate member is formed in a frame shape as viewed from a direction perpendicular to the radiation detection panel.

5. The radiation detection device according to claim 2, wherein the second housing portion is disposed between the support member and the first housing portion.

6. The radiation detection device according to claim 2, wherein each of the first housing portion and the second housing portion has an exposed surface that constitutes a rear surface of the housing on a side opposite to a radiation incidence side, and
the exposed surface of the first housing portion and the exposed surface of the second housing portion are coplanar.

7. The radiation detection device according to claim 2, wherein the second housing portion is divided into a plurality of parts.

8. The radiation detection device according to claim 1, wherein the intermediate member is a double-sided tape having a foam or a resin as a base material.

9. The radiation detection device according to claim 1, wherein the intermediate member is formed in a frame shape as viewed from a direction perpendicular to the radiation detection panel.

10. The radiation detection device according to claim 1, wherein the second housing portion is disposed between the support member and the first housing portion.

11. The radiation detection device according to claim 1, wherein each of the first housing portion and the second housing portion has an exposed surface that constitutes a rear surface of the housing on a side opposite to a radiation incidence side, and
the exposed surface of the first housing portion and the exposed surface of the second housing portion are coplanar.

12. The radiation detection device according to claim 1, wherein the second housing portion is divided into a plurality of parts.

13. The radiation detection device according to claim 1, wherein the radiation detection panel comprises a light detection substrate and a scintillator.

14. The radiation detection device according to claim 13, wherein the scintillator is formed on the light detection substrate.

* * * * *